(12) United States Patent
Nelakonda et al.

(10) Patent No.: US 11,720,924 B2
(45) Date of Patent: Aug. 8, 2023

(54) SYSTEMS AND METHODS FOR COOKIELESS OPT-OUT OF DEVICE SPECIFIC TARGETING

(71) Applicant: Cinarra Systems, Inc., Santa Clara, CA (US)

(72) Inventors: Sathyender Nelakonda, Cupertino, CA (US); Nikhil Mishra, Cupertino, CA (US); William Leece, Cupertino, CA (US); Aman Dhora, Cupertino, CA (US)

(73) Assignee: Cinarra Systems, Inc., Santa Clara, CA (US)

( * ) Notice: Subject to any disclaimer, the term of this patent is extended or adjusted under 35 U.S.C. 154(b) by 401 days.

(21) Appl. No.: 15/480,243

(22) Filed: Apr. 5, 2017

(65) Prior Publication Data

US 2018/0293624 A1    Oct. 11, 2018

(51) Int. Cl.
*G06Q 30/0251*    (2023.01)
*G06Q 30/0241*    (2023.01)
(Continued)

(52) U.S. Cl.
CPC ..... *G06Q 30/0267* (2013.01); *G06Q 30/0277* (2013.01); *H04L 61/4511* (2022.05);
(Continued)

(58) Field of Classification Search
CPC ..... H04W 4/021; H04W 12/08; H04W 68/00; H04W 80/04; H04W 4/06; H04W 88/02;
(Continued)

(56) References Cited

U.S. PATENT DOCUMENTS

| 10,034,135 B1 | 7/2018 | Provost et al. |
| 2002/0046084 A1 | 4/2002 | Steele et al. |

(Continued)

FOREIGN PATENT DOCUMENTS

| JP | 2016525242 A | 8/2016 |
| WO | WO2015/027074 A2 | 2/2015 |
| WO | WO2017/004688 A1 | 1/2017 |

OTHER PUBLICATIONS

Nelakonda et al.; U.S. Appl. No. 15/486,214 entitled "Systems and methods for relevant targeting of online digital advertising," filed Apr. 12, 2017.

(Continued)

*Primary Examiner* — Chinyere Mpamugo
(74) *Attorney, Agent, or Firm* — Shay Glenn LLP

(57) ABSTRACT

Systems and methods for allowing a subscriber to opt-out of targeted digital advertisements are provided. In one implementation, a mobile network operator operations support system server receives an input from a subscriber, the input comprising an account number and a stable network-level identifier. The server then causes a message to be sent to the mobile device along with a URL based on the input from the subscriber. The server receives a beacon that is generated when the subscriber visits the website, and sends a message to a mobile analytics platform server indicating a preference on whether the subscriber wants to receive targeted digital advertisements.

8 Claims, 4 Drawing Sheets

(51) Int. Cl.
*H04L 61/4511* (2022.01)
*H04L 61/2514* (2022.01)
*H04L 101/65* (2022.01)
*H04L 101/622* (2022.01)
*H04L 101/654* (2022.01)

(52) U.S. Cl.
CPC .... *H04L 61/2514* (2013.01); *H04L 2101/622* (2022.05); *H04L 2101/65* (2022.05); *H04L 2101/654* (2022.05)

(58) Field of Classification Search
CPC .... G06F 16/29; G06F 16/9535; G06F 21/604; G06F 16/951; G06Q 30/0269; G06Q 30/02; G06Q 30/0273; G06Q 30/0267; G06Q 30/0277; G06Q 30/0207–0277; H04L 61/6059; H04L 67/02; H04L 61/1511; H04L 12/2816; H04L 67/2814; H04L 61/2007; H04L 61/609; H04L 67/18; H04L 67/141; H04L 61/2514; H04L 61/6054; H04L 61/605; H04L 61/6022; H04L 61/4511; H04L 2101/622; H04L 2101/65; H04L 2101/654; G08G 5/006; G08G 5/0069; B64C 39/024; H04M 2250/10; H04M 1/72457
See application file for complete search history.

(56) References Cited

U.S. PATENT DOCUMENTS

| | | | |
|---|---|---|---|
| 2006/0149844 A1 | 7/2006 | Droz et al. | |
| 2008/0010143 A1 | 1/2008 | Kniaz et al. | |
| 2008/0065774 A1 | 3/2008 | Keeler | |
| 2008/0172495 A1 | 7/2008 | Storm | |
| 2008/0256216 A1 | 10/2008 | Aarts | |
| 2009/0089420 A1 | 4/2009 | Caruso et al. | |
| 2010/0180013 A1 | 7/2010 | Shkedi | |
| 2010/0228593 A1 | 9/2010 | Belwadi et al. | |
| 2010/0228625 A1 | 9/2010 | Priyadarshan et al. | |
| 2010/0291907 A1* | 11/2010 | MacNaughtan | H04L 67/53 463/41 |
| 2011/0055021 A1 | 3/2011 | Haag | |
| 2011/0265116 A1 | 10/2011 | Stern et al. | |
| 2011/0302025 A1 | 12/2011 | Hsiao et al. | |
| 2012/0014316 A1 | 1/2012 | Rahman | |
| 2012/0054143 A1 | 3/2012 | Doig et al. | |
| 2012/0116838 A1 | 5/2012 | Bisdikian et al. | |
| 2012/0158472 A1 | 6/2012 | Singh et al. | |
| 2012/0278161 A1 | 11/2012 | Lazzaro | |
| 2012/0316992 A1 | 12/2012 | Oborne | |
| 2013/0066711 A1 | 3/2013 | Liyanage et al. | |
| 2013/0121252 A1 | 5/2013 | Peng et al. | |
| 2013/0124309 A1 | 5/2013 | Traasdahl et al. | |
| 2013/0124331 A1 | 5/2013 | Doughty et al. | |
| 2013/0173788 A1 | 7/2013 | Song | |
| 2013/0288668 A1 | 10/2013 | Pragada et al. | |
| 2014/0032727 A1 | 1/2014 | Kano et al. | |
| 2014/0059192 A1 | 2/2014 | Miklós | |
| 2014/0095297 A1 | 4/2014 | O'Reilly | |
| 2014/0129352 A1 | 5/2014 | Ringdahl | |
| 2014/0258434 A1 | 9/2014 | Hong et al. | |
| 2014/0365311 A1 | 12/2014 | Eulenstein et al. | |
| 2015/0019721 A1* | 1/2015 | Zinin | H04L 61/103 709/224 |
| 2015/0067118 A1 | 3/2015 | Gatto et al. | |
| 2015/0088663 A1 | 3/2015 | Schechter et al. | |
| 2015/0089061 A1 | 3/2015 | Li et al. | |
| 2015/0106198 A1 | 4/2015 | Miller et al. | |
| 2015/0113564 A1 | 4/2015 | Mushikabe | |
| 2015/0262235 A1 | 9/2015 | Neal et al. | |
| 2015/0310485 A1 | 10/2015 | Brown | |
| 2015/0312255 A1 | 10/2015 | Libonate et al. | |
| 2015/0324857 A1 | 11/2015 | Siegel et al. | |
| 2015/0358818 A1 | 12/2015 | Dipsola | |
| 2016/0110775 A1 | 4/2016 | Moiz et al. | |
| 2016/0117740 A1 | 4/2016 | Linden et al. | |
| 2016/0155143 A1 | 6/2016 | Hsiao et al. | |
| 2016/0182658 A1 | 6/2016 | Allinson et al. | |
| 2016/0232570 A1 | 8/2016 | Wilson | |
| 2016/0247188 A1 | 8/2016 | Zhou | |
| 2017/0091815 A1* | 3/2017 | Brill | G06Q 30/0255 |
| 2017/0091817 A1 | 3/2017 | Lenhart et al. | |
| 2017/0337589 A1 | 11/2017 | Yu | |
| 2018/0053218 A1 | 2/2018 | Singh et al. | |
| 2019/0080350 A1 | 3/2019 | Hughes et al. | |

OTHER PUBLICATIONS

Nelakonda et al.; U.S. Appl. No. 15/642,124 entitled "Systems and methods for cookieless conversion measurement of online digital advertising," filed Jul. 5, 2017.

Polonetsky et al.; Cross device: understanding the state of state management; Future of privacy forum; Nov. 2015; retrived from the internet (https://fnf.org/wp-content/uploads/2015/11/FPF_FTC_CrossDevice_F_20pg-3.pdf) on 20 pages; Dec. 14, 2021.

* cited by examiner

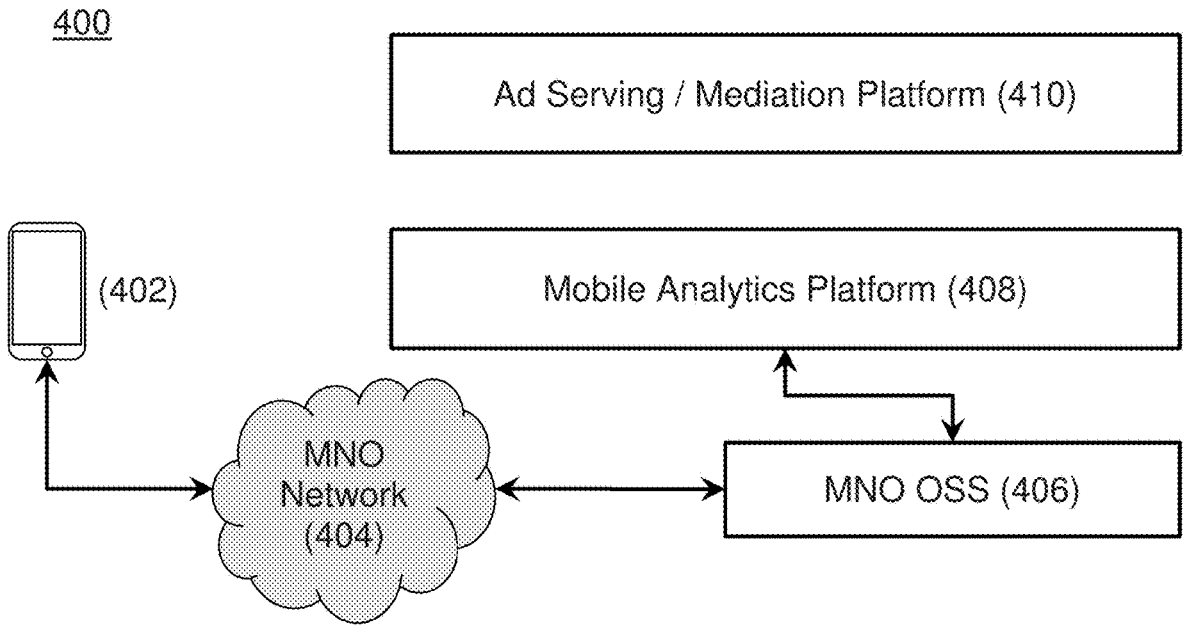
FIGURE 4: MNO Portal Opt-Out
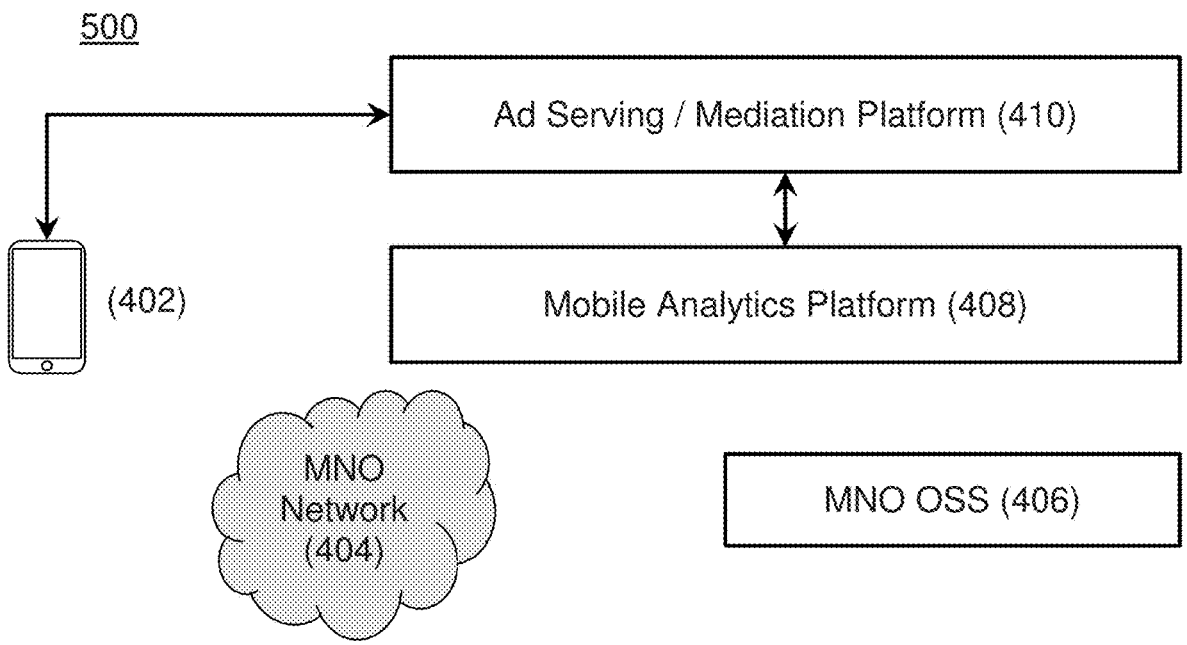
FIGURE 5: DSP Opt-Out

SYSTEMS AND METHODS FOR COOKIELESS OPT-OUT OF DEVICE SPECIFIC TARGETING

CROSS REFERENCE TO RELATED APPLICATIONS

This application is related to U.S. Published Application No. 2015/0019721, filed on Jul. 11, 2014, and entitled "Method And System For Correlation Of Internet Application Domain Identities And Network Device Identifiers," which claims priority to and the benefit of U.S. Provisional Patent Application No. 61/845,331, filed on Jul. 11, 2013, and entitled "Method And System For Correlation Of Internet Application Domain Identities And Network Device Identifiers."

INCORPORATION BY REFERENCE

All publications and patent applications mentioned in this specification are incorporated herein by reference in their entirety to the same extent as if each individual publication or patent application was specifically and individually indicated to be incorporated by reference.

BACKGROUND

Field of Innovation

This disclosure is generally related to field of online digital advertising. It addresses the need to provide users with the ability to opt-out of targeted advertising from ad recommendation and/or serving platforms.

Description of the Related Art

Developers of internet applications, such as web services and mobile apps (e.g., Apple iOS or Android OS applications) consistently strive to provide a personalized experience to their end users by equipping the applications with the ability to store user-specific settings or user preferences. Applications utilize different mechanisms to achieve this goal: web applications use the Hypertext Transfer Protocol (HTTP) cookie mechanism (HTTP Cookie), mobile apps make use of persistent device or user identifiers such as universally unique identifier (UUID), open device identification number (ODIN), or Identifier for Advertisers (IFA). While different in implementation, the above methods rely on the property that a certain unique piece of data that is associated with a particular user (or an application initiated by the user) remains consistent for a sufficient duration of time, and is exchanged by the involved parties (e.g., the web browser and the web server, or the mobile application and the mobile back-end server) for the purpose of identifying the user. These application-level identities can be utilized exclusively by the applications or may be passed on to other components for the purpose of providing the user with customized data. As a non-limiting example, a web page that includes a web advertisement may pass the user-associated cookie to the web advertising platform for the purpose of selecting the most relevant ad for the particular user. Similarly, a mobile application that integrates with a mobile ad platform may pass the associated universal device identifier (UDID), or OpenUDID, to the advertising platform for the purpose of ad targeting.

Telecommunication providers typically operate with the user devices at a lower level, such as the mobile network (e.g., Wi-Fi, or Global System for Mobile Communications (GSM)/Universal Mobile Telecommunications System (UMTS) network) providing connectivity at the physical level, or at the network level, such as an Internet Protocol (IP) network, by providing transport capabilities to Internet and mobile applications. Providers' networks are typically concerned with network-level device identifiers (such as Media Access Control (MAC) addresses, International Mobile Subscriber Identity (IMSI), International Mobile Station Equipment Identity (IMEI), IP addresses, subscriber account number or phone number), and do not have direct visibility of application-level identifiers discussed earlier. The role of the provider's network for the applications is to deliver data packets from one device to another using routing and switching mechanisms that utilize network-level identifiers to identify a particular device. Network-level identifiers are also used by provider networks to perform mobility management purposes and consolidate accounting and billing information.

Clear separation of responsibilities between telecommunication providers and application platforms has its advantages, such as improved scalability (since the provider networks need only be aware of devices, and not all applications running on them), as well as privacy (providers normally do not know which specific applications are installed and utilized by the users). However, a number of cases have recently arisen in which the ability of applications and provider systems to interwork would present particular advantages to the end user. As a specific example, enabling a mobile network provider to help advertising platforms better target advertisements by utilizing, for example, location and statistical information about its subscribers would benefit the end users, as it would minimize delivery of unrelated ads. For a provider to participate in the ad targeting process (or any other process requiring understanding of the application-level identities), a mechanism to establish a relationship between application-level identities and network-level device identifiers is desirable. Such a mapping allows utilization of provider intelligence about devices at the application level.

Advertising platforms need to be able to provide end users with the ability to opt-out of targeted advertising. Currently this done by placing a cookie in the user's browser. On a typical platform the opt-out period only lasts for the lifetime of the cookies installed in the browser of the user device or until those cookies are cleared by the user intentionally or unwittingly. The opt-out procedure is only effective for the specific browser for which the cookies are set. Other browsers and applications on the user's device are not affected by the opt-out performed on the one browser, and the user must opt-out from each separate application to completely opt-out of all ad targeting on a device.

What is needed and is not provided by the prior art are systems and methods that address the need to provide users with the ability to opt-out of targeted advertising from ad recommendation and/or serving platforms, without requiring the use of cookies.

SUMMARY OF THE DISCLOSURE

Systems and methods for allowing a subscriber to opt-out of targeted digital advertisements are provided. In one implementation, a mobile network operator operations support system server receives an input from a subscriber, the input comprising an account number and a stable network-level identifier. The server then causes a message to be sent to the mobile device along with a URL based on the input from the subscriber. The server receives a beacon that is generated when the subscriber visits the website, and sends a message to a mobile analytics platform server indicating a preference on whether the subscriber wants to receive targeted digital advertisements.

According to aspects of the present disclosure, mobile device subscribers are provided with a mechanism for opting-out at a device level, as opposed to an opt-out scheme that relies on cookies. In some embodiments, the opt-out request lasts for the lifetime of the device. After a subscriber opts-out using one of the disclosed systems and methods, targeted ads (relying on the mobile network operator data for targeting) are no longer sent to the subscriber. If the subscriber changes browsers or clears the cookies from a browser, the opt-out setting still remains in place. The single opt-out setting is good across all applications, browsers and websites used by the subscriber. With the present systems and methods, the subscriber can opt-out not only from ad targeting but also profiling.

In some embodiments, a system for allowing a subscriber to opt-out of targeted digital advertisements comprises a mobile network operator operations support system server. The server comprises at least one memory for storing computer-executable instructions and at least one processor for executing the instructions. In these embodiments, the execution of the instructions programs the server to perform operations comprising receiving an input from a subscriber, causing a message to be sent to a mobile device, receiving a beacon, and sending a message to a mobile analytics platform. The input from the subscriber comprises an account number and a stable network-level identifier associated with the mobile device of the subscriber. The message sent to the mobile device is based on the input from the subscriber, and the message comprises a uniform resource locator for the subscriber to follow to a website. The beacon is generated when the subscriber visits the website. The message sent to the mobile analytics platform server indicates a preference on whether the subscriber wants to receive targeted digital advertisements.

In the above systems, the preference of the subscriber may be to opt-out of or to opt-in to receiving targeted digital advertisements. The stable network-level identifier may be an International Mobile Station Equipment Identity (IMEI), a Media Access Control (MAC) address, an International Mobile Subscriber Identity (IMSI), a subscriber account number, or a subscriber phone number.

In some embodiments, a method for allowing a subscriber to opt-out of targeted digital advertisements is provided. The method may comprise receiving an input from a subscriber, causing a message to be sent to a mobile device of the subscriber, receiving a beacon, and sending a message indicating a preference on whether the subscriber wants to receive targeted digital advertisements. The input from the subscriber is received by a mobile network operator operations support system server, and comprises an account number and a stable network-level identifier associated with the mobile device. The message sent to the mobile device is sent by the mobile network operator operations support system server based on the input from the subscriber. The message comprises a uniform resource locator for the subscriber to follow to a website. The beacon is generated when the subscriber visits the website and is received by the mobile network operator operations support system server. The message indicating a preference is sent by the mobile network operator operations support system server to a mobile analytics platform server.

In the above methods, the preference of the subscriber may be to opt-out of or opt-in to receiving targeted digital advertisements. The stable network-level identifier may be an International Mobile Station Equipment Identity (IMEI).

In some embodiments, a system for allowing a subscriber to opt-out of targeted digital advertisements comprises an ad serving and mediation platform server. The server comprises at least one memory for storing computer-executable instructions and at least one processor for executing the instructions. In these embodiments, the execution of the instructions programs the server to perform operations comprising sending an ad to a mobile device of a subscriber, receiving a targeted digital advertisements preference request from the mobile device along with an advertising identity and a transitory network-level identifier, and sending the targeted digital advertisements preference request to a mobile analytics platform server along with a stable network-level identifier associated with the mobile device.

In the above systems, the targeted digital advertisements preference request received from the mobile device may be a request to opt-out of or to opt-in to receiving targeted digital advertisements. The stable network-level identifier may be an International Mobile Station Equipment Identity (IMEI), a Media Access Control (MAC) address, an International Mobile Subscriber Identity (IMSI), a subscriber account number, or a subscriber phone number. The ad serving and mediation platform may comprise a demand-side platform portal.

In some embodiments, a method for allowing a subscriber to opt-out of targeted digital advertisements comprises sending an ad, receiving a targeted digital advertisements preference request, and sending the targeted digital advertisements preference request. The ad is sent by an ad serving and mediation platform server to a mobile device of a subscriber. The targeted digital advertisements preference request is received by the ad serving and mediation platform server from the mobile device along with a transitory network-level identifier. The targeted digital advertisements preference request is sent by the ad serving and mediation platform server to a mobile analytics platform server along with a stable network-level identifier.

In the above methods, the targeted digital advertisements preference request received from the mobile device may be a request to opt-out of or op-in to receiving targeted digital advertisements. The stable network-level identifier may be an International Mobile Station Equipment Identity (IMEI). The method may further comprise receiving information, by the ad serving and mediation platform server, from a mobile network operator about subnets which have discoverable, stable network-level identifiers. The ad serving and mediation platform may comprise a demand-side platform portal.

The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which:

FIG. 4 is a diagram depicting an exemplary embodiment of a mobile network operator portal opt-out system and method.

FIG. 5 is a diagram depicting an exemplary embodiment of a demand-side platform opt-out system and method.

DETAILED DESCRIPTION

Figure 1:
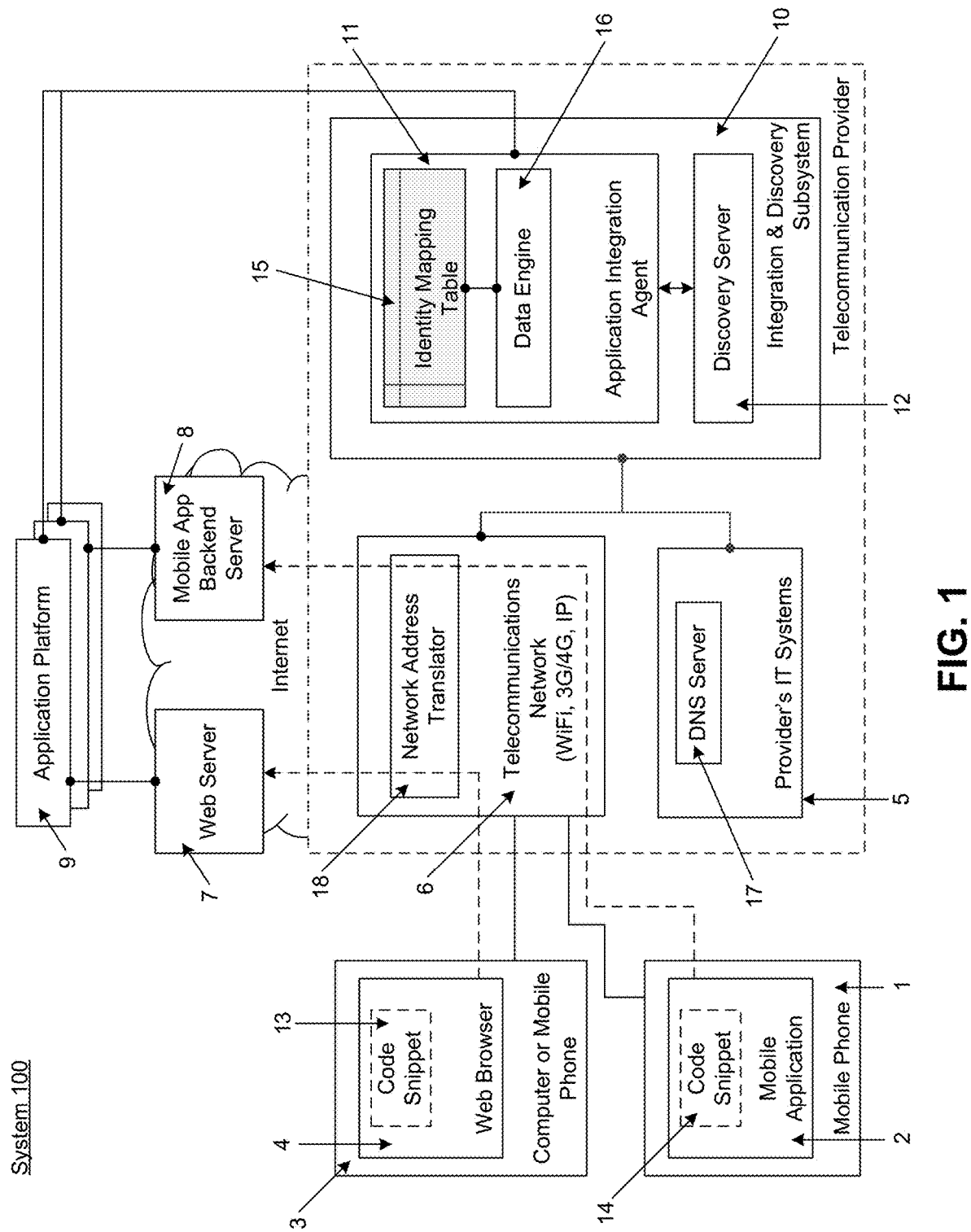
FIG. 1 is a diagram depicting a system architecture according to an aspect of the disclosure.

The present disclosure is illustrated by way of example and not by way of limitation in accompanying drawings in which like references indicate similar elements. It should be noted that references to "an" or "one" or "some" embodiment(s) in this disclosure are not necessarily to the same embodiment, and such references mean at least one.

Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and multiple hosts can be connected by one or more networks.

As used herein, the terms "engine" and "server" may refer to software, firmware, hardware, or any other component that is used to effectuate a purpose. The engine or server may include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program may include calls to hardware components (such as input/output (I/O) devices), which may require the execution of drivers. The drivers may or may not be considered part of the engine or server.

As used herein, the term "database" is used broadly to include any known or convenient means for storing data, whether centralized or distributed, relational or otherwise.

As used herein, the term "mobile device" may be, but is not limited to, a cell phone, such as an Apple iPhone, a portable electronic device, such as an Apple iPod Touch, Apple iPad, Microsoft Surface, and a mobile device based on the Google Android operating system, a smart watch, smart glasses, and any other portable electronic device that includes software, firmware, hardware, or a combination thereof that is capable of providing the functionality described herein. Typical components of the mobile device may include, but are not limited to, persistent memories like flash read-only memory (ROM), random access memory like static random-access memory (SRAM), a camera, a battery, liquid crystal display (LCD) driver, a display, a cellular antenna, a speaker, a Bluetooth circuit, and Wi-Fi circuitry, where the persistent memory may contain programs, applications, and/or an operating system for the mobile device.

As used herein, the term computer can be but is not limited to, a personal computer or a laptop, such as a Hewlett-Packard Pavilion desktop computer, Dell Ultrabook laptop, Apple MacBook laptop, or other electronic device based on an operating system such as Microsoft Windows or Apple OS X, and any other electronic device that includes software, firmware, hardware, or a combination thereof that is capable of providing the functionality described herein. Typical components of the computer may include but are not limited to persistent memories like flash ROM, random access memory like SRAM, a battery, a hard-disk or solid-state drive, a display adapter, a network controller used for connecting to a fixed-line network, a speaker, a Bluetooth circuit, and Wi-Fi circuitry, where the persistent memory may contain programs, applications, and/or an operating system for the computer.

Various implementations of the systems described herein can use appropriate hardware or software; for example, certain components can execute on server class computers that have sufficient memory, data storage, and processing power and that run a server class operating system (e.g., Oracle® Solaris®, GNU/Linux®, and the Microsoft® Windows® family of operating systems) or other hardware (e.g., mobile devices, computers, etc.) capable of running an operating system such as the Microsoft Windows® operating systems, the Apple OS X® operating systems, the Apple iOS® platform, the Google Android™ platform, the Linux® operating system and other variants of UNIX® operating systems, and the like. The system can include a plurality of software processing modules stored in a memory and executed on a processor. By way of illustration, the program modules can be in the form of one or more suitable programming languages, which are converted to machine language or object code to allow the processor or processors to execute the instructions. The software can be in the form of a standalone application, implemented in a suitable programming language or framework.

In various implementations, the devices include a web browser, client software, or both. The web browser allows the device to request a web page or other downloadable program, applet, or document (e.g., from a server) with a web page request. One example of a web page is a data file that includes computer executable or interpretable information, graphics, sound, text, and/or video, that can be displayed, executed, played, processed, streamed, and/or stored and that can contain links, or pointers, to other web pages. In one implementation, a user of the device manually requests a web page from the server. Alternatively, the device automatically makes requests with the web browser. Examples of commercially available web browser software are Microsoft® Internet Explorer®, Mozilla® Firefox®, and Apple® Safari®.

In some implementations, the devices include client software. The client software provides functionality to the device that provides for the implementation and execution of the features described herein. The client software can be implemented in various forms, for example, it can be in the form of a web page, widget, and/or Java, JavaScript (JS), .Net, Silverlight, Flash, and/or other applet or plug-in that is downloaded to the device and runs in conjunction with the web browser. The client software and the web browser can be part of a single client-server interface; for example, the client software can be implemented as a "plug-in" to the web browser or to another framework or operating system. Any other suitable client software architecture, including but not limited to widget frameworks and applet technology can also be employed with the client software.

Communication among servers, computers, mobile devices, and other components can take place over media such as standard telephone lines, LAN or WAN links (e.g., T1, T3, 56 kb, X.25), broadband connections (ISDN, Frame Relay, ATM), wireless links (802.11 (Wi-Fi), Bluetooth, GSM, CDMA, etc.), for example. Other communication media are contemplated. The network can carry TCP/IP protocol communications, and HTTP/HTTPS requests made by a web browser, and the connection between the user devices and servers can be communicated over such TCP/IP networks. Other communication protocols are contemplated.

Method steps of the techniques described herein can be performed by one or more programmable processors executing one or more computer programs to perform functions by operating on input data and generating output. Method steps can also be performed by, and the modules can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store instructions that, when executed by a processor, form the modules and other components described herein and perform the functionality associated with the components. The processor and the memory can be supplemented by, or incorporated in special purpose logic circuitry.

The system can also be practiced in distributed computing environments where tasks are performed by remote processing devices that are linked through a communications network. In a distributed computing environment, program modules can be located in both local and remote computer storage media including memory storage devices. Other types of system hardware and software than that described herein can also be used, depending on the capacity of the device and the amount of required data processing capability. The system can also be implemented on one or more virtual machines executing virtualized operating systems such as those mentioned above, and that operate on one or more computers having hardware such as that described herein.

It should also be noted that implementations of the systems and methods can be provided as one or more computer-readable programs embodied on or in one or more articles of manufacture. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

An exemplary embodiment of a system configured according to aspects of the present disclosure is illustrated in FIG. 1. A system 100 is provided that includes the following elements: a collection of mobile phones (1) and computers (3), jointly referred to as "devices," executing mobile applications (2) or web browsers (4). Devices are provided access to the Internet by connecting to the service provider's (5) telecommunication network (6) using one or more of multiple access technologies. In one embodiment of the present disclosure, the devices (1, 3) are connected using Wi-Fi technology. In another embodiment of the disclosure, the devices (1, 3) can be connected using 3G or 4G cellular technologies such as GSM, UMTS or Wideband Code Division Multiple Access (WCDMA).

The web browser (4) requests an HTML web page by establishing an HTTP connection over the Internet to the web server (7). Similarly, the mobile application (2) submits a request to and receives a response from the back-end server (8) using one of the transport protocols and data serialization technologies. As a non-limiting example, the application (2) may use an HTTP-based protocol with queries and responses encoded in HTML or Extensible Markup Language (XML). When the web browser (4) sends its initial request to a web server (7), the web server (7) has the option of providing the browser (4) with an unique HTTP cookie that is stored by the browser (4) and will be included in all subsequent HTTP requests to the same web server (7), which will use it to determine that the requests are coming from the same user.

When a mobile application (2) first initiates execution, it may allocate or calculate a unique device or user identifier using one of the methods provided by the mobile operating systems. As a non-limiting example, applications (2) executing on the Android operating system may use ANDROID_ID or UUID, those running on Apple iOS may utilize IFA, and some or all applications (2) may choose to create application-specific accounts for each user and utilize a unique application-specific user ID. The application (2) then includes the identifier in its protocol queries to the back-end server (8), that uses the identifier to distinguish different users and provide customized data. In its normal operation, the role of the telecommunication network (6) of the provider (5) may include routing packets that encapsulate application-level protocol packets (such as HTTP) from devices (1, 3) to servers (7, 8) and back, and the network (6) may not have visibility of the application-level identifiers and may not employ any mechanisms to establish a relationship between them and the network-level device identifiers of the user, such as the MAC address, mobile phone IMEI, IMSI, subscriber account number, phone number, or other stable identifier. For example, an operator may provide a salted hash of a MAC address as a network-level device identifier.

The present disclosure introduces an Integration and Discovery Subsystem (10) that includes one or more Application Integration Agents (AIA) (11) and one or more Discovery Servers (DS) (12). The AIA (11) integrates with the Application Platform (9) that provides content to the web and mobile applications (2, 4). In one embodiment of the disclosure, the Application Platform (9) is an advertising platform that integrates with the web server (7) and/or the mobile app back-end server (8) and dynamically supplies Internet advertising units to the servers (7, 8) in the form of snippets of dynamically interpreted code (13, 14) that are provided to the client web browser (4) or mobile application (2) as part of a web page or response to the data query, and are dynamically rendered by the browser (4) and the mobile application (2), triggering additional protocol requests to fetch the components referenced in the code snippet. As a non-limiting example, the code snippets may be represented as HTML code snippets dynamically rendered by the web browser (4) or an HTML rendering library in the application (2), and individual components may be represented by images or JavaScript code obtained through HTTP requests. In another embodiment of the disclosure, the Application Platform (9) provides the servers (7, 8) with dynamically generated content describing certain content of user interest (video, music, books, as non-limiting examples) similarly encoded in HTML snippets or any other dynamically interpreted languages (such as XML) that triggers the client web or mobile application (2, 4) to request images or other scripts through additional protocol requests.

Through integration with the Application Platform (9), the AIA (11) is able to participate in data transactions initiated by the web and mobile applications (2, 4) and provide units of content or other data that may subsequently be included by the Application Platform (9) in its responses to the applications (2, 4). This serves two goals: (a) establishment of the initial mapping between the application-level identities and network-level device or user identifiers, and (b) subsequent customization of application user data content, based on the Identity Mapping Table (IMT) (15) maintained by the AIA (11) and user analytics data created by the Data Engine (16), by utilizing information inside the provider's network (6) and IT systems (5).

Figure 2:
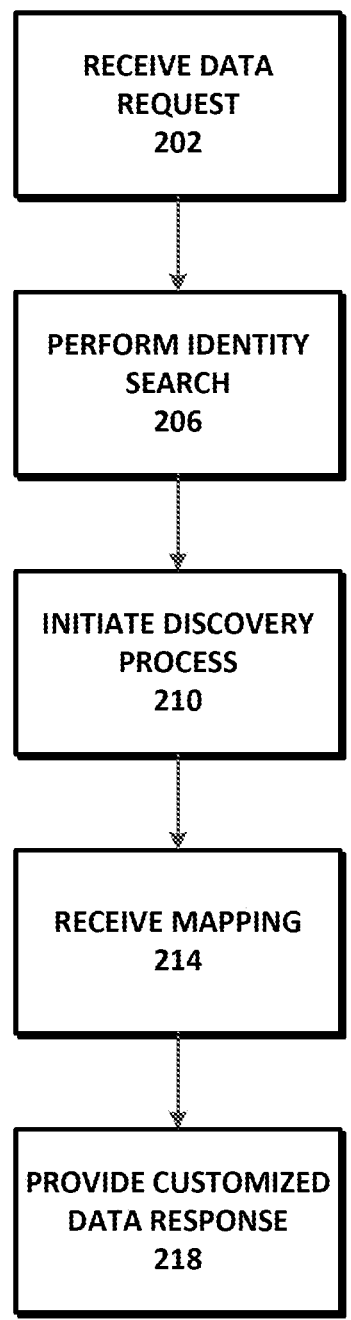
FIG. 2 is a flowchart depicting an example method for determining a relationship between an application-level identifier and a network-level identifier according to an aspect of the disclosure.

In one embodiment, referring to FIG. 2, in the initial state, the AIA's Identity Mapping Table (15) is empty. When the AIA (11) receives a request for data from the Application Platform (9) (STEP 202), it performs a search operation in the IMT (15) for the user identity provided in the request (web cookie or mobile application identifier) (STEP 206). The result of the search for the first transaction will be negative, and the AIA (11) initiates the discovery process described below (STEP 210). As a result of the discovery process, the AIA (11) obtains mapping between the application identity and the network-level identifier from the Discovery Server (12) (STEP 214). Subsequently, the AIA (11) uses the mapping to provide a customized data response to the Application Platform (9) (STEP 218).

The present disclosure includes three equally valid exemplary embodiments of methods for the discovery mechanism. It is to be appreciated, however, that other methods for the discovery mechanism are contemplated.

Figure 3A:
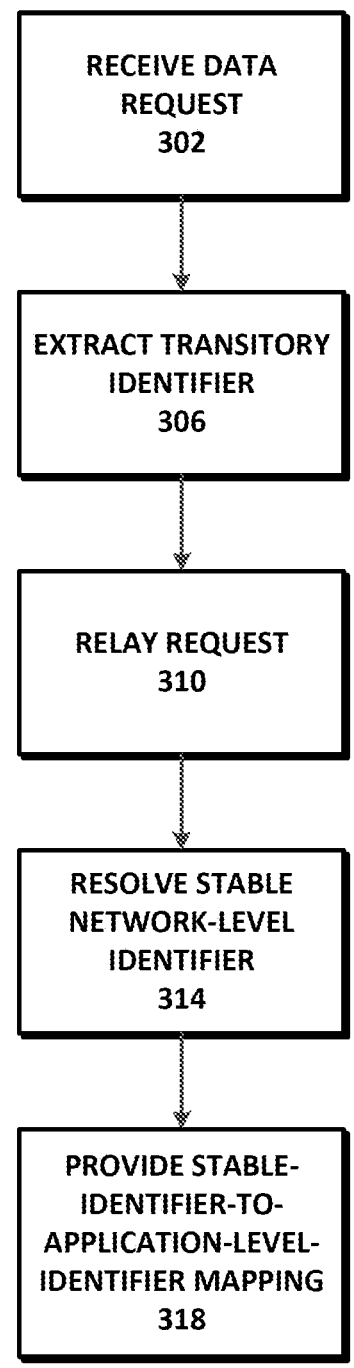
FIGS. 3A-3C are flowcharts depicting example discovery processes according to aspects of the disclosure.

In Method 1, shown in FIG. 3A, hosting of the data units provided by the Application Platform (9) to the application (2, 4) is not modified (i.e., they are still hosted and served by the Application Platforms (9)). Instead, the provider's DNS server (17) is configured to resolve the symbolic name of the server referenced in the data elements provided to the applications (2, 4) with the IP address of the Discovery Server (12). The Discovery Server (12) receives the data request from the application (2, 4) which includes the application identity (included by default by the application or provided by the AIA (11) as part of the data unit description) (STEP 302), establishes the mapping of this identity to the IP address of the device (1, 3) by extracting the source IP address from the data request (STEP 306), and relays the request to the original data server using the application-specific proxy functionality (STEP 310). The application-identity-to-IP-address mapping is further resolved to the stable network identifier of the device (1, 3), such as MAC address, IMEI, or IMSI, or other stable identifier, by analyzing the corresponding IP address allocation records that are usually available in the provider's network (6) (STEP 314). The final mapping is supplied to the AIA (11) server (STEP 318).

In Method 2, the AIA (11) actively participates in the Application Platform's (9) data selection process and provides it with references to the data units that are hosted by the Integration and Discovery Subsystem (10) (STEP 322). The references are constructed so that they are received by the Discovery Server (12) and include the value of the application-level identity. The rest of the discovery process can be the same as with Method 1. In one embodiment of the disclosure, where the Application Platform (9) is an advertising platform, the AIA (11) provides the Platform (9) with an HTML code snippet that includes a URL (Uniform Resource Locator) to the image file containing the ad creative with the Discovery Server (12) as the server name. When the client application renders the HTML snippet, it initiates the request for the image file that is received by the Discovery Server (12) inside the provider's premises.

In Method 3, the data units can be hosted by the Application Platform (9) itself (as in Method 1) or by an affiliated platform outside the provider's premises; however, the AIA (11) also supplies an additional portion of the code that includes a reference to a fake data unit at the Discovery Server (12) (hereby referred to as the Discovery Beacon) (STEP 332). The beacon integrates the application-level identity provided in the original request. The rest of the discovery process can be the same as with Method 1. In one embodiment of the disclosure, where the Application Platform (9) is an advertising platform, the data response from the AIA (11) is an HTML snippet for the recommended advertisement that includes a web beacon. As a non-limiting example, the discovery web beacon inside the HTML snippet is implemented as a reference to an invisible image targeted at the Discovery Server (12), as illustrated in the code fragment below. The URL used in the beacon integrates the application-level identity.

```
<!-- Discovery beacon first -->
<img src="http://ds.xtele.com/mapid?appid=7651276512765" width="0" height="0">
<!-- The creative HTML snippet is below-->
<a href="http://www.cinarra.com" target="_blank">
<img width="728" height="90" border="0"
src="http://adsrv.cinarra.com/1234567/728x90Image.JPG">
</a>
```

In another implementation, instead of or in addition to including the application-level identifier (e.g., appid) in the beacon and in a lookup table maintained by the Discovery Server (12), a temporary or otherwise short-lived unique transaction identifier can be substituted or added to the application-level identifier. This can provide additional security in the event, for example, that the application-level identifier is comprised.

One aspect of the Discovery Process includes capturing the IP address of the user before the request goes through the Network Address Translator (NAT) (18). The role of NAT (18) is to translate a larger number of private IP addresses utilized inside the provider's network (6) to a smaller pool of public IP addresses. NAT (18) enforces sharing of a single public IP address among multiple users and devices, hence making it impossible to use a public IP address for device identification purposes. In one implementation, the Discovery Server (12) is positioned inside the provider's private address domain. The disclosure supports multiple private IP address domains, if used by the provider, by utilizing multiple instances of the DS (12) or a single instance that maintains separate connection to each individual private IP address domain and distinguishes private IP addresses with the same value from different domains.

Referring to FIG. 4, a first exemplary embodiment 400 of an opt-out scheme configured according to aspects of the present disclosure is provided. In this first embodiment, the opt-out instructions from mobile device 402 go through a mobile network operator (MNO) 404. If a subscriber chooses to opt-out from advertisements that are targeted to the subscriber (or opt-in for that matter), the subscriber goes to the MNO's portal and inputs the subscriber's account number and the International Mobile Station Equipment Identity (IMEI) of the subscriber's device. The mobile network operator operations support system (MNO OSS) 406 is configured to then send a message (e-mail, text, etc.) to the subscriber's device 402. The subscriber then clicks on a URL in the message to confirm the intent to opt-out. This generates a beacon which in some embodiments is directed to a sub-system of an MNO partner. This beacon is then redirected to the MNO OSS 406 which in turn sends a message to the Mobile Analytics Platform 408 to inform the relevant portion of the platform to stop targeting (opt-out) the identified subscriber. The Ad Serving/Mediation Platform 410, which plays a central role in serving ads to subscribers who have not opted-out, is not involved in the opt-out process in this first exemplary embodiment. Additionally, no cookies are required to be placed on device 402 for the opt-out process to work.

In some implementations, once the customer opts-out the customer can be automatically opted back in after a stipulated interval of time. In this case no selection or intervention is needed from the subscriber side. The subscriber is informed of this via a message (e-mail, text, etc.) from the MNO OSS 406. The subscriber can then once again choose to opt-out of the targeted advertising.

In the exemplary embodiment shown in FIG. 4, whenever the subscriber option (opt-in or opt-out) changes, the MNO's user database is updated to reflect the mobile subscriber's intent and the Mobile Analytics Platform 408 is informed accordingly. Four specific situations are discussed below.

Figure 3C:
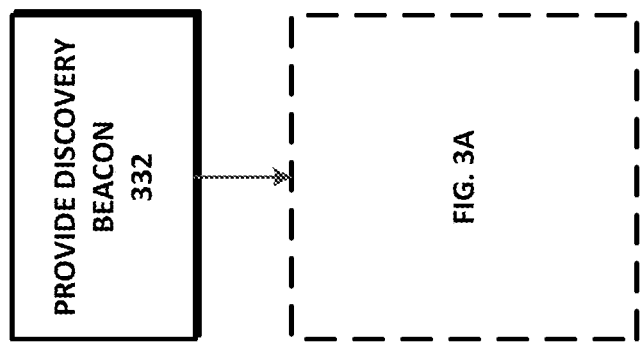
Figure 3B:
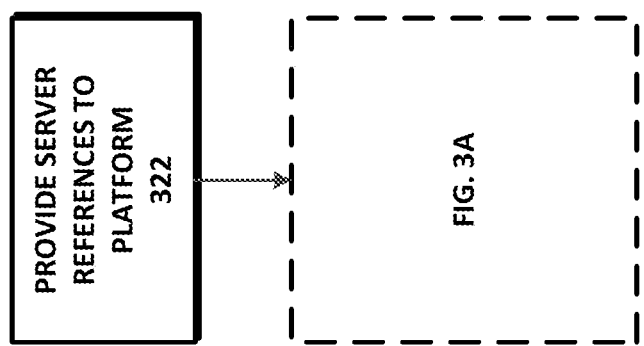

MNO Case 1: Currently discovered/known subscriber—In this situation, one or more records associated with the subscriber's mobile device have already been "discovered" by the Mobile Analytics Platform 408, as previously described in reference to FIGS. 1-3. These subscriber records have a unique Anonymized Sub Identity (ASID) associated with each subscriber mobile device 402 within the Mobile Analytics Platform 408. In Case 1, there are two scenarios: the subscriber is opting out or opting in.

Opt-Out: A subsystem of the Mobile Analytics Platform 408 receives the opt-out message from the MNO OSS 406 and marks this subscriber with a "OPTED_OUT" flag. All the segment tags associated with this subscriber are then cleared from all subsystems within Mobile Analytics Platform 408. Additionally, location updates for this mobile device 402 are not processed for generating any analytics. Further attempts at targeting this subscriber will result in either a "no bid" or an ad bid based purely on technical parameters (rather than segment tags associated with the subscriber.) No additional details about the opted-out subscriber are retained once the "OPTED_OUT" flag is set.

Opt-In: The Mobile Analytics Platform 408 subsystem receives the opt-in message from the MNO OSS 406 and clears the "OPTED_OUT" flag for this subscriber, and starts building up the segment tags for the subscriber based on the information from the MNO 404 and the location updates for the mobile device 402 which will be processed in the appropriate subsystem(s) of Mobile Analytics Platform 408.

MNO Case 2: Currently unknown subscriber—In this situation, no records associated with the subscriber's mobile device are present in the Mobile Analytics Platform 408. When the MNO sends out such a message, it would be processed as follows, depending on whether it is an opt-out request or an opt-in request.

Opt-Out: The Mobile Analytics Platform 408 will process and create a new record for the subscriber info with the "OPTED_OUT" flag set so any advertising ID's "learned and mapped" to this subscriber's record will also respect the settings.

Opt-In: Mobile Analytics Platform 408 will process and create a new record for the subscriber info with the "OPTED_OUT" flag reset so that any advertising ID's learned and mapped to this subscriber will be able to process location updates and create/generate segment tags for the subscriber.

In order to improve the reliability of delivery of the information related to the Opt-In/Opt-Out choices made by the subscriber, this information exchanged should be acknowledged between the MNO OSS 406 and the Mobile Analytics Platform 408. Because subscriber privacy is extremely important, subscriber Opt-In/Opt-Out choices should be strictly and reliably enforced in the Mobile Analytics Platform 408. In order to improve robustness, the Mobile Analytics Platform 408 should also handle refresh attempts by the MNO OSS 406 to send this Opt-In/Opt-Out information.

Referring to FIG. 5, a second exemplary embodiment 500 of an opt-out scheme configured according to aspects of the present disclosure is provided. In this second embodiment, the opt-out instructions from mobile device 402 are via the Demand-Side Platform (DSP) portal rather than through the mobile network operator (MNO) 404. A subscriber can choose to opt-out directly by interacting with the DSP. A specific scenario is discussed below.

The subscriber clicks a specific icon within an ad displayed on the user device 402 served by the DSP. In some embodiments, the icon is located at the top right corner of the displayed ad. In some embodiments, this arrangement is configured to work for opt-out only, while in other embodiments this arrangement works for both opt-out and opt-in. Clicking on the ad icon sends the subscriber's "advertising identity" (the user identity in the advertising world that was used to serve the ad to the particular subscriber) to a DSP portal.

The subscriber will first be directed to the advertising partner's DSP portal where he/she can review the DSP privacy policy. When the subscriber arrives at the DSP portal through DSP Case 1 above, the "advertising identity" of the subscriber is sent in the query string. The portal page may have a button that will allow the subscriber to confirm the opt-out request. When the subscriber clicks on one of these buttons, a HTTP request is sent to a subsystem in the Ad Serving/Mediation Platform 410 for that particular market. The HTTP request will be sent with the advertising identity in the query string parameters.

The subsystem looks up the subscriber device record as previously described and pushes the opt-out preference accordingly to the appropriate Mobile Analytics Platform 408. After the subscriber opt-out setting is set correctly in the subsystem, the rest of the implementation works in a similar manner to the one described in the previous section (MNO Portal Opt-Out).

If the subscriber is not known/discovered in the Mobile Analytics Platform 408, the DSP partner will not be able to help the subscriber with the opt-out request, since these implementations do not insert any cookies on the subscriber's device 402 as a part of the solution.

In some embodiments, just one of the MNO portal or DSP portal opt-out/opt-in systems are implemented. In other embodiments, both of the MNO portal or DSP portal opt-out/opt-in systems are implemented so that subscribers can choose to use one or both systems. For example, a particular subscriber could use one system to opt-out and later use the other system to opt back in.

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention. The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

What is claimed is:

1. A system for allowing a consumer subscriber to opt-out of targeted digital advertisements, the system comprising:
    a mobile network operator operations support system server comprising at least one memory for storing computer-executable instructions and at least one processor for executing the instructions, wherein the execution of the instructions programs the server to perform operations comprising:
    the mobile network operator operations support system receiving an input to opt-out of targeted digital advertisements, the input comprising an account number and a stable network-level identifier for a mobile device of a consumer subscriber;
    sending a message by the mobile network operator operations support system to the mobile device based on the input, the message comprising a uniform resource locator for the consumer subscriber to follow to a website to confirm an intent of the consumer subscriber to opt-out of the targeted digital advertisements;
    the mobile network operator operations support system receiving a beacon that is generated when the consumer subscriber visits the website; and
    the mobile network operator operations support system sending a message to a mobile analytics platform server indicating that the consumer subscriber does not want to receive targeted digital advertisements, the system further comprising:
    one or more computers including a mapping server inside a telecommunications provider network, the one or more computers programmed to perform operations comprising:
    sending a data request to the mapping server for data stored on a server external to the telecommunications provider network;
    receiving the data request at the mapping server, the data request comprising an application-level identifier and a transitory network-level identifier for the mobile device of the consumer subscriber;
    determining, by the mapping server, a stable network-level identifier for the mobile device based on the transitory network-level identifier by:
    extracting the transitory network-level identifier from the data request; and
    resolving the stable network-level identifier based on IP address allocation records available within the telecommunications provider network and corresponding to the transitory network-level identifier;
    mapping, by the mapping server, the application-level identifier to the stable network-level identifier; and
    wherein the stable network-level identifier is selected from the group consisting of a MAC address, an IMEI, and an IMSI of the client device.

2. The system of claim 1, wherein the stable network-level identifier is an International Mobile Station Equipment Identity (IMEI).

3. The system of claim 1, wherein the stable network-level identifier is a Media Access Control (MAC) address.

4. The system of claim 1, wherein the stable network-level identifier is an International Mobile Subscriber Identity (IMSI).

5. The system of claim 1, wherein the stable network-level identifier is a subscriber account number.

6. The system of claim 1, wherein the stable network-level identifier is a subscriber phone number.

7. A method for allowing a consumer subscriber to opt-out of targeted digital advertisements, the method comprising:
    receiving, by a mobile network operator operations support system server, an input to opt-out of targeted digital advertisements, the input comprising an account number and a stable network-level identifier for a mobile device of the consumer subscriber;
    sending a message, by the mobile network operator operations support system server, to the mobile device based on the input, the message comprising a uniform resource locator for a consumer subscriber to follow to a website to confirm an intent of the consumer subscriber to opt-out of the targeted digital advertisements;
    receiving a beacon, by the mobile network operator operations support system server, the beacon having been generated when the consumer subscriber visits the website;
    sending a message, by the mobile network operator operations support system server, to a mobile analytics platform server indicating that the consumer subscriber does not want to receive targeted digital advertisements;
    sending a data request to a mapping server for data stored on a server external to a telecommunications provider network;
    receiving the data request at the mapping server, the data request comprising an application-level identifier and a transitory network-level identifier for the mobile device of the consumer subscriber;

determining, by the mapping server, a stable network-level identifier for the mobile device based on the transitory network-level identifier by:

extracting the transitory network-level identifier from the data request; and resolving the stable network-level identifier based on IP address allocation records available within the telecommunications provider network and corresponding to the transitory network-level identifier; and mapping, by the mapping server, the application-level identifier to the stable network-level identifier, wherein the stable network-level identifier is selected from the group consisting of a MAC address, an IMEI, and an IMSI of the mobile device.

8. The method of claim 7, wherein the stable network-level identifier is an International Mobile Station Equipment Identity (IMEI).

\* \* \* \* \*